United States Patent [19]

Nagano

[11] Patent Number: 4,727,636

[45] Date of Patent: Mar. 1, 1988

[54] MANUFACTURING METHOD FOR AN ELLIPTIC GEAR

[75] Inventor: Masashi Nagano, Izumi, Japan

[73] Assignee: Shimano Industrial Company Limited, Osaka, Japan

[21] Appl. No.: 890,356

[22] Filed: Jul. 29, 1986

[30] Foreign Application Priority Data

Jul. 31, 1985 [JP] Japan .................................. 60-170136

[51] Int. Cl.⁴ ................................................ B21K 1/30
[52] U.S. Cl. .................................... 29/159.2; 474/141
[58] Field of Search .................. 29/159.2; 74/446, 447; 474/141, 152, 164

[56] References Cited

FOREIGN PATENT DOCUMENTS 577887 6/1946 United Kingdom ............... 29/159.2

Primary Examiner—P. W. Echols
Attorney, Agent, or Firm—Stevens, Davis, Miller & Mosher

[57] ABSTRACT

The method includes providing an aluminum plate having an outer peripheral portion in an elliptic shape, the outer peripheral portion including a plurality of tooth portions. An intermediate element is formed by pressing the aluminum plate to cause the outer peripheral portion of the plate to project unidirectionally in a thickness direction with respect to a radially inward portion of the intermediate element to form a flange at the outer peripheral portion. The plurality of tooth portions are formed at this flange. A plurality of teeth members are formed by cutting the flange of the intermediate element in a thickness direction thereof at an outer surface in a projecting direction of the flange to reduce the thickness of the flange relative to the thickness of the intermediate element.

4 Claims, 6 Drawing Figures

MANUFACTURING METHOD FOR AN ELLIPTIC GEAR

FIELD OF THE INVENTION

This invention relates to a manufacturing method for an elliptic gear used primarily for a bicycle and more particularly to a manufacturing method for an elliptic gear made of an aluminum plate.

BACKGROUND OF THE INVENTION

Generally, bicycle gears are formed in a round or elliptic shape and are made of iron or aluminum plates.

Elliptic gears made of aluminum plates are advantageous because they are lightweight and can be manufactured by punching an aluminum plate. If the aluminum plate, as a starting material, has thickness corresponding to that of the gear teeth members to be provided, there is no need, after punching of the plate, to arrange the thickness of the tooth portions for providing teeth members, thus resulting in a simple manufacturing operation to that extent to thereby provide economical mass production. However, the disadvantage is encountered that the base portion of the gear, exclusive of the teeth members has insufficient strength.

To eliminate this disadvantage, the starting material conventionally uses an aluminum plate having a larger thickness than the teeth members to be provided. The aluminum plate is punched by use of a press machine to form an intermediate element with a number of tooth portions on the outer periphery. The intermediate element is then worked on in a circular cutting operation at both side faces of the tooth portions by use of an NC milling machine or a customary engine lathe, so as to reduce the thickness of the tooth portions in comparison with the substantial thickness of the base portion of the intermediate element, thereby forming teeth members.

The NC milling machine, when used to perform a cutting operation on the tooth portions of the elliptic intermediate element formed by punching of the aluminum plate as described above, can make cuttings each of the same length extending radially inwardly from the tips of all the tooth portions on the sides of major and minor axes of the intermediate element, but this operation takes long hours to perform the cutting and is expensive and not suitable for mass production.

Alternatively, a customary engine lathe can be used for the cutting operation of the tooth portions to form the teeth members. This method is cheaper and can reduce the necessary hours for the cutting in comparison with the work by the NC milling machine. However, in this method using the engine lathe, since the tooth portions of the intermediate element which is rotated are cut by a cutting tool, a radially inward surface of the intermediate element (at which surface the cutting by the cutting tool terminates) is made circular, so that the amount of cutting in the radial direction is larger at the tooth portions at the major axis side of the gear than those at the minor axis side, resulting in a problem of lower strength of the teeth member portions at the major axis side.

SUMMARY OF THE INVENTION

The invention is designed to overcome the above problems. An object of the invention is to provide a manufacturing method for an elliptic gear made of an aluminum plate. This method enables an elliptic gear of an aluminum plate to be effectively and quickly formed by means of a press operation and a cutting operation with a customary engine lathe, and can avoid a lowering of the strength of teeth member portions at the major axis side of the elliptic gear.

The manufacturing method for an elliptic gear of the present invention comprises the steps of (1) forming an intermediate element by subjecting an aluminum plate which is in elliptic shape and provided with tooth portions, to a press operation to cause the outer peripheral portion to project unidirectionally in the plate's thickness direction with respect to the radially inward portion (which is nearer the center than the outer peripheral portion is) to thereby form a flange at the outer peripheral portion at which flange is formed a number of tooth portions; and (2) forming teeth members by cutting an outer surface in the projecting direction of the flange of the intermediate element in the plate's thickness direction to reduce the thickness of the tooth portions forming part, i.e., the flange, relative to the substantial thickness of the intermediate element to thereby form teeth members.

The invention is first characterized in that the employed aluminum plate is thick enough to give the necessary strength, in punched by a press operation to have an elliptic shape, and is caused by a press operation at its outer peripheral portion which is formed with tooth portions to project unidirectionally in the plate's thickness direction with respect to the radially inward portion of the plate, thereby forming an intermediate element which has an elliptic shape and has a cross-sectional shape of a dish with a flange.

A second characteristic of the invention is that the part of the plate forming the tooth portions (i.e., the flange portion, which projects unidirectionally in the plate's thickness direction with respect to the radially inward portion which serves as a base portion of the elliptic chain gear and hence is the portion thereof bearing the most strength) is cut to make the thickness of the tooth portions forming part (i.e., the flange portion) correspond to a driving chain used in the bicycle. In other words, since the portion to be cut is the tooth portions forming part (i.e., the flange projecting in the plate's thickness direction with respect to the base portion) the cutting operation can be made by use of a customary engine lathe (as in the case of formation of a round gear) without use of an NC milling machine, and in the cutting process there is no cutting work to be performed at the base portion which requires a greater amount of strength, while the process enables only the tooth portions forming part, i.e., the flange, to be cut.

As a result, according to the invention, an elliptic gear can be manufactured effectively and quickly, by punching in a press operation using a press machine and by a cutting operation using a common engine lathe, without diminishing the strength of the gear.

The above and further objects and novel features of the invention will be more fully apparent from the following detailed description when read in connection with the accompanying drawings.

DETAILED DESCRIPTION OF THE INVENTION

Figure 1:
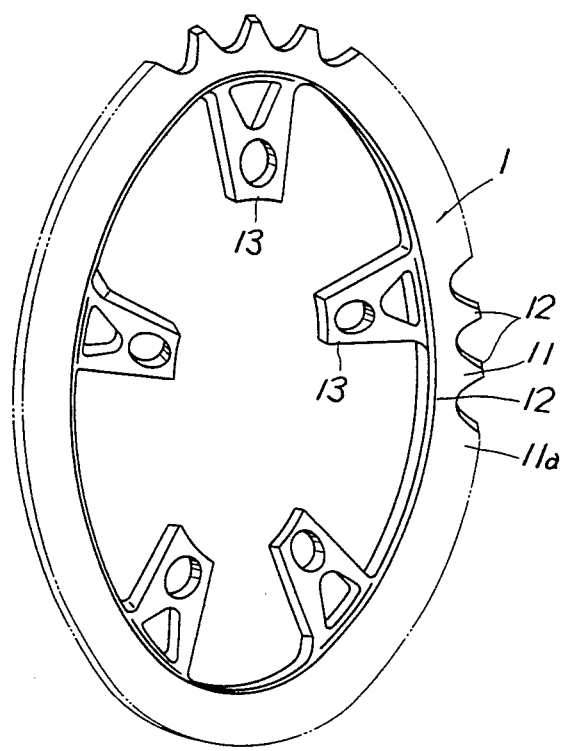
FIG. 1 is a perspective view of the intermediate element manufactured by the manufacturing method of the present invention.

A starting material in the manufacturing method for an elliptic gear of the present invention employs an aluminum plate having a thickness (T), for example, of 2.8 mm and a higher hardness provided by a solution heat treatment.

First, the aluminum plate is shaped to include an intermediate element 1 having an outer peripheral portion with an elliptic shape and with a plurality of teeth portions 11. The aluminum plate is pressed by a press machine to shape intermediate element 1 such that its outer peripheral portion, which has an elliptic shape and is provided with tooth portions, is caused to project unidirectionally in the plate's thickness direction with respect to the radial inward portion 10 (which is nearer the center of the element 1 than the outer peripheral portion is) to thereby form a flange 11 at the outer peripheral portion. Flange 11 is formed with a number of tooth portions 12.

Figure 2:
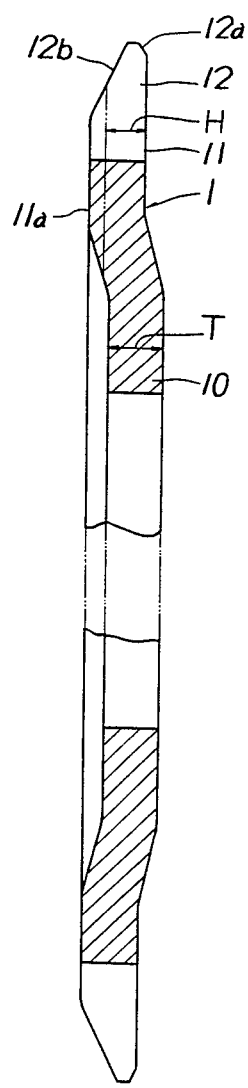
FIG. 2 is a partially enlarged longitudinal sectional view of the intermediate element of FIG. 1.

The intermediate element 1 does, as shown in FIG. 2, project at an outer peripheral portion (i.e., the flange 11 formed with the tooth portions 12) unidirectionally in the plate's thickness direction (i.e., toward a left side in FIG. 2) with respect to the radial inward portion (10), and has a cross-sectional shape like that of a dish with a flange.

Next, the flange 11 of intermediate element 1 is subjected to a cutting operation, at an outer surface 11a in the projecting direction, e.g., 0.8 mm in the plate's the thickness direction, so that thickness (H) of tooth portions 12 is smaller by 0.8 mm than the thickness (T) (e.g., 2.8mm) of the intermediate element 1, thereby forming teeth members 2 with a thickness of 2.0 mm.

Figure 3:
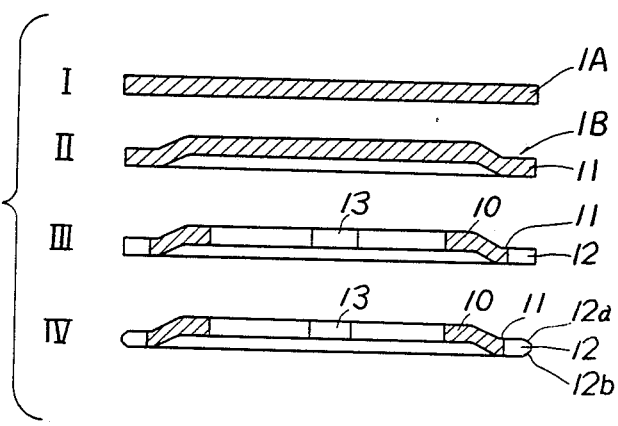
FIG. 3 is an explanatory view showing the press operations performed on the intermediate element.

Formation of the intermediate element 1 may be made, by use of a press machine, through simultaneous operations of punching and projection steps. It is preferable to form the intermediate element mainly by the following four processes of press operations as shown in FIG. 3.

(1) First process (I) for punching the aluminum plate (1A) of 2.8 mm thickness to be elliptic in shape.

(2) Second process (II) wherein the elliptic element (1B) is projected at its outer peripheral portion unidirectionally in the plate's thickness direction with respect to the central portion so as to form a flange 11.

(3) Third process (III) wherein the elliptic element (1B) is punched at the flange 11 for forming the tooth portions 12 and also at the central part for forming the radially inward portion (i.e., the base portion) 10, and also forming a plurality of mounting legs 13 which extend radially inwardly from the radial inward portion (i.e., the base portion) 10.

(4) Fourth process (IV) for forming slant surfaces 12a, 12b by pressing surfaces at both sides of the tips of the tooth portions 12.

The intermediate element 1 may also be formed only by the first or second process of the press work rather than by all of the aforesaid four processes.

The intermediate element 1 formed by the press operations as described above is thereafter, treated in age hardening to have a hardness (i.e., at least HRB 80) for giving a sufficient durability (or proof stress, yield strength) to the chain gear for bicycles. This age hardening is made before the cutting operation of the flange 11 at the intermediate element 1, then, the formation of the teeth members 2 is made. Alternatively, the age hardening may be made after the cutting work of the flange. Furthermore, depending on selection of the starting material, there may be no need for the age hardening process.

The cutting work of the flange is made preferably by a customary engine lathe, wherein the intermediate element 1 is supported by a chuck in the engine lathe system and rotated, and a cutting tool is moved radially inwardly from a point in the rotation path of the outer peripheral edge 1a of the flange at the major axis side of the intermediate element 1, to a point in the rotation path of the inner peripheral edge 1b of the flange at the minor axis side.

That is, the cutting work performed by the cutting tool is done only on the outer surface at the projecting side of the flange 11 which projects with respect to the general plane of intermediate element 1. Thus, the width of the flange 11 in the radial direction is set to be the same over the entire periphery of the flange, so that the amount of cutting ($W_1$) in the radial direction at the major axis side is equal to cutting amount ($W_2$) in the radial direction at the minor axis side.

Thus, the operation causes no lowering of the strength of the teeth member portions at the major axis side, thus providing uniform strength of each of the teeth members 2.

The projection amount of flange 11 of the intermediate element 1 havng a cross-sectional shape like that of a dish with a flange may preferably be an amount that is at least equal to the difference between thickness (T) of intermediate element 1 and the thickness (H) of the teeth members.

As seen from the above, an intermediate element 1 is first made such that an aluminum plate having a sufficient thickness to provide the necessary strength to yield a satisfactory gear is pressed to cause its outer peripheral portion, which is provided with tooth portions 12, to project unidirectionally in the plate's thickness direction with respect to the radial inward portion 10 to thereby form a flange 11 at the outer peripheral portion, at which flange 11 are formed a number of tooth portions 12, so that the intermediate element 1 has a cross-sectional shape of a dish with a flange and is elliptic in a front view. Then, the flange 11 of intermediate element 1 is subject to a cutting operation in the plate's thickness direction at the outer surface 11a in the projecting direction so as to reduce the thickness of the forming part of tooth portions 12, i.e., of flange 11, with respect to the substantial thickness of intermediate element 1, thereby forming teeth members 2 having a thickness corresponding to the driving chain to be used. As a result, the cutting operation can be made by use of a customary engine lathe and can provide a cutting amount in the radial direction at the major axis side which is equal to that at the minor axis side. This avoids diminishing the strength of teeth member portions at the major axis side to thereby provide uniform strength at each of the teeth member portions. This yields a gear which is durable as a whole, is lightweight, and is cheap to produce.

Figure 4:
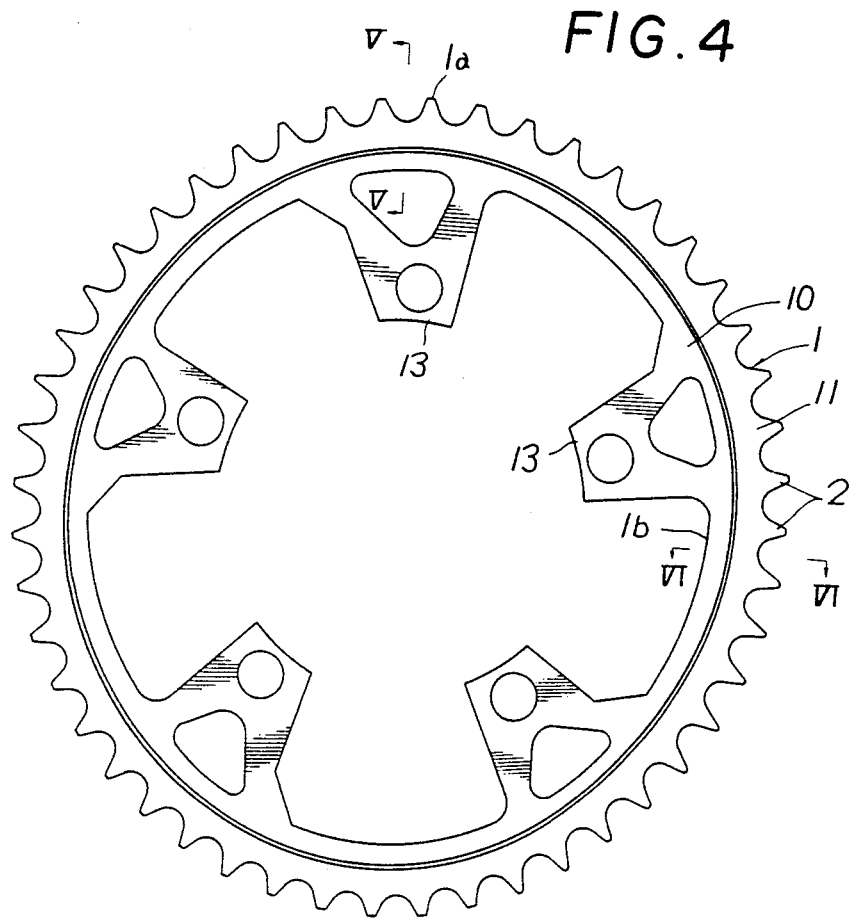
FIG. 4 is a front view of an elliptic gear manufactured by the manufacturing method of the present invention.
Figure 5:
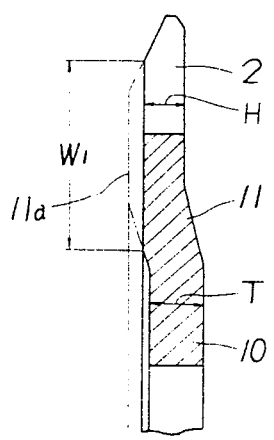
FIG. 5 is a sectional view taken on the line V—V in FIG. 4.
Figure 6:
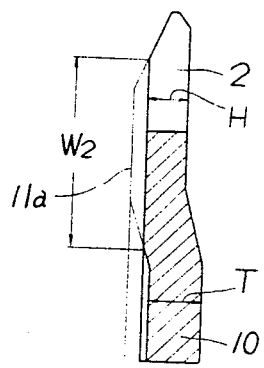
FIG. 6 is a sectional view taken on the line VI—VI in FIG. 4.

The elliptic shape referred to in the description of the above embodiments of the invention should not be limited to an ellipse which is formed symmetrically with respect to major and minor axes but may include a transformed ellipse-shape as shown in FIG. 4.

While an embodiment of the invention has been shown and described, the invention is not limited to the specific features thereof, which is merely exemplary in the specification rather than defined.

What is claimed is:

1. A manufacturing method for a elliptic gear, said method compriisng the steps of:
   (a) providing an aluminum plate having an outer peripheral portion in an elliptic shape,
   (b) forming an intermediate element having a substantially cup-shaped cross-section by pressing said aluminum plate to cause said outer peripheral portion of said plate to project unidirectionally in a thickness direction of said intermediate element with respect to a radially inward portion of said intermediate element to form a flange at said outer peripheral portion, and
   (c) forming a plurality of teeth members at said outer peripheral portion by cutting said flange of said intermediate element in a thickness direction thereof at an outer surface in a projecting direction of said flange to reduce a thickness of said flange relative to a thickness of said intermediate element.

2. A manufacturing method for an elliptic gear according to claim 1, wherein in step (b) said aluminum plate is pressed by a punching operation, said outer peripheral portion of elliptic shape is subjected to a press operation to project unidirectionally in a thickness direction of said intermediate element with respect to a central portion of said aluminum plate so as to form said flange, said flange is punched to form said tooth portions, said central portion is punched to provide a plurality of mounting legs, and surfaces of tips of said tooth portions are pressed.

3. A manufacturing method for an alliptic gear according to claim 1, wherein after step (a) and before step (b) said intermediate element is subjected to an age hardening treatment.

4. A manufacturing method for an elliptic gear according to claim 1, wherein after step (b) and before step (c) said intermediate element is subjected to an age hardening treatment.

* * * * *